Dec. 19, 1967 W. R. JOHNSON 3,358,372
FOLDING SQUARE
Filed Feb. 28, 1967
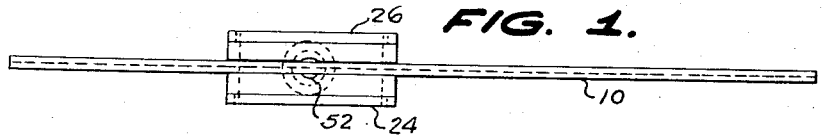
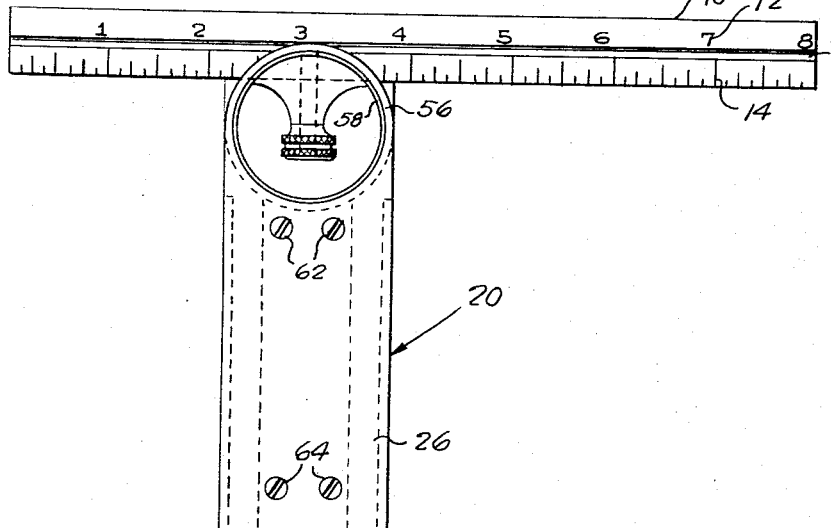
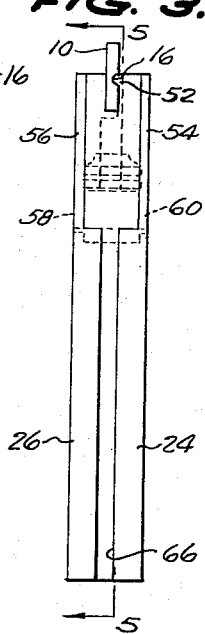
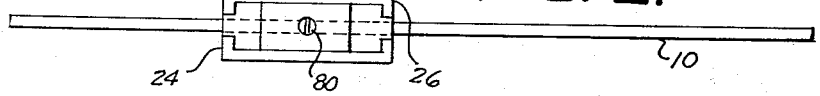
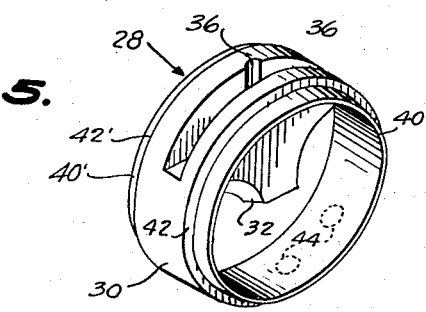
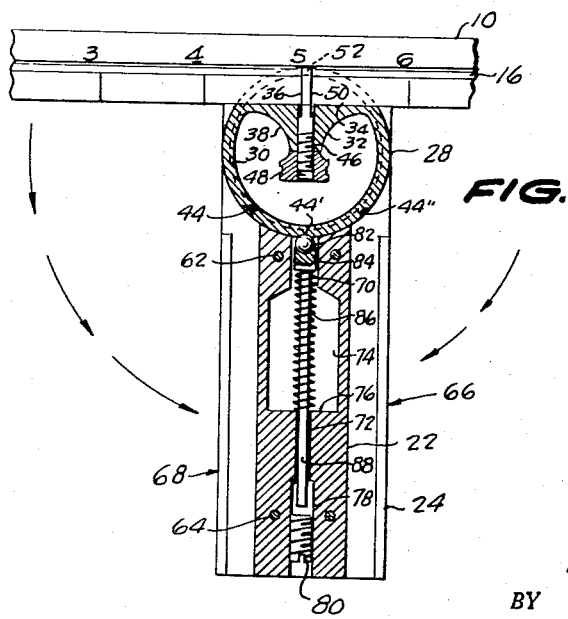
INVENTOR.
WILLIAM R. JOHNSON,
BY
Kimmel, Crowell & Weaver
ATTORNEYS.

United States Patent Office 3,358,372
Patented Dec. 19, 1967

3,358,372
FOLDING SQUARE
William R. Johnson, 107 Live Oak St.,
Planada, Calif. 95365
Filed Feb. 28, 1967, Ser. No. 619,378
5 Claims. (Cl. 33—102)

ABSTRACT OF THE DISCLOSURE

A carpenter's square in which a scale member is slidably received in a pivot ring and a pair of opposed handle members are pivotally received on the pivot ring and secured together by a central support block to permit the scale member to fold substantially into and parallel with the handle and a resiliently biased ball for engaging in recesses in the pivot ring to fix the angular relationship between the pivot ring and the scale member and means for fixing the ball in said recesses is disclosed.

Background of the invention

*Field of the invention.*—This invention relates to geometric measuring instruments and more particularly to carpenters' squares and the like.

*Description of the prior art.*—Angularly adjustable straight edge members including handles upon squares are known in the prior art. Such angularly adjustable straight edge members, however, are generally designed to meet specific problems and for specific purposes and do not have general utility. Furthermore, such devices as are known in the prior art are generally either inaccurate and therefore have found only limited acceptance or are unduly complex and expensive and have not found general acceptance in the trade. The present invention relates to a carpenter's square in which the handle may be folded into a position substantially parallel with the scale member or accurately adjusted at a desired angular position. The present invention is a square of general utility being both rugged and accurate.

Summary

The principal object of this invention is in the provision of a compact rugged accurately adjustable handle and pivot ring assembly for a square. In its preferred form, the handle comprises a central block for the pair of opposed handle members each having a circular opening proximate one end for receiving a pivot ring, said handles being secured to the central support block.

Another important feature and object of the invention resides in the means for selectively locking the angular position of the handle with respect to the scale member.

The overall combination, constructional features, and design elements also constitute objects of the invention.

Brief description of the drawing

FIGURE 1 is a top view of the square of this invention showing the scale member and the handle.

FIGURE 2 is a side view taken substantially at right angles with respect to the view of FIGURE 1 showing the square of this invention.

FIGURE 3 is an end view of the square of FIGURE 2 taken at a pivoted angle of 90° with respect to the view thereof.

FIGURE 4 is a bottom view of a square taken from the bottom of FIGURE 2.

FIGURE 5 is a side view of the handle construction in partial cut-away of cross section showing the details of interior construction which constitute an important feature of the invention.

FIGURE 6 is an isometric view of the pivot ring of this invention.

Description of the preferred embodiment

The invention comprises, in combination, a straight edge scale member 10 which may be of conventional construction being provided with numerals 12 and scale indicia 14 and with a groove 16 along at least one side. Scale members of this type, including the groove, are known in the prior art and as such constitute no part of the invention except in combination with the other elements as hereinafter described.

The square also comprises a handle 20 which includes a central support block 22 and side members 24 and 26. The side members 24 and 26 are pivotally secured about a pivot ring 28, which is shown in isometric view in FIGURE 6, in a manner to be described.

As best shown in FIGURES 5 and 6, the pivot ring 28 comprises a generally annular portion 30 which has, preferably, unitarily and integrally formed therein a locking bolt support portion 32. A scale slot 34 for receiving the scale member 10 is provided in one side of the pivot ring 28. A locking bolt groove 36 is formed in one side of the scale slot and extends in the form of a locking bolt passage 38, as best shown in FIGURE 5. The scale slot, locking bolt groove and locking bolt passage may be of a design conventionally used in hand squares with a slidable scale member.

To provide a pivoting arrangement between the handle and the pivot ring, and consequently between the handle and the scale member, the annular portion 30 is provided with a pair of oppositely extending annular lips 40 which intersect with the annular portion 30 to form a shoulder 42. The outer perimeter of the annular portion 30 is also provided with a plurality of ball receiving recesses 44, shown in FIGURES 5 and 6.

A locking bolt 46 which is threaded at one end to receive a thumbscrew nut 48 and provided with a locking extension 50 and a locking boss 52 is received in passage 38 in locking bolt support 32 in a conventional manner. Thus, the scale member 10 can be fixed in position relative to the pivot ring 28 or it may be released for slidable movement relative thereto.

Each of the handle portions 24 and 26 are provided with arcuate end portions 54 and 56, as best shown in FIGURES 2, 3 and 5. In the arcuate end portion of each of the handle members 24 and 26 there is provided a circular opening 58 and 60 in the respective handle members. The two handle members 24 and 26 are secured together by means of screws 62 and 64 which may threadably be received in central support block 22, as best shown in FIGURES 2 and 5.

The two handle members are configured and dimensioned in a manner to provide a pair of slots 66 and 68 on opposite sides of the central support block as a result of their being secured to the central support block 22 in spaced apart relation. The spaced apart relation provides the slots 66 and 68 which permit the scale member 10 to be pivoted relative to the handle and to be received either in slot 66 or slot 68 in a substantially parallel relation with respect to the handle.

An important feature resides in the construction of the central support block and the means included therein for fixing the angular relationship of the handle relative to the pivot ring and consequently relative to the scale member 10. Accordingly, the central support block is provided with a ball guide passage 70 and a plunger rod guide passage 72 which, in the preferred embodiment, is relatively smaller than the ball guide passage 70. An enlarged spring opening may also be provided which intersects with the plunger rod guide passage to form a shoulder shown at 76. A set screw passage comprises an extension of the plunger rod guide passage and is threaded to threadably receive a set screw 80. A ball 82 is received in the ball guide passage and a slidable ball guide member 84 is also received in the ball guide passage. Spring 86, which is a compression spring, resiliently biases the ball guide and the ball toward the pivot ring, being engaged at its distal end by shoulder 76 and being received about plunger rod 88.

As will be apparent from the description and the drawing, as shown, the ball guide 84 which is secured to one end of plunger rod 88 is free to move against the resilient force exerted by spring 86 to permit the ball to move from the recesses 44 to another position and to be received selectively in the individual recesses 44 which, in a preferred embodiment, may be provided at 90° with respect to the scale member and at 45° relative thereto. In additon, other convenient or desired angles such as 30° or 60° may also be used. Thus, when it is desired to change the angular relationship between the handle and the scale members it is necessary only to exert sufficient force to force the ball out of the recess and move the handle so that the ball is received in the desired recess. If, however, it is desired to fixedly secure the angular relationship between the handle and the scale member, set screw 80 may be moved inwardly to engage the distal end of plunger 88 thereby fixing the ball 44 in the selected recess. In this condition, it is not possible to change the angular relationship without releasing set screw 80 again.

As previously pointed out, the important features of the invention include the relative mechanical simplicity of the design which provides ample flexibility for all purpose use. It will also be realized that while the invention has been described with respect to a specific embodiment and has been abstracted and summarized in specific terms to assist in the easy understanding of the invention that the abstract, summary and disclosure is intended as merely exemplary and that the variations may be made from the exact embodiment disclosed without departing from the spirit and scope of the invention as limited and defined in the following claims.

I claim:
1. A folding square which comprises, in combination:
 a straight edge scale member of the type having a groove along at least one side;
 a generally annular pivot ring, said ring being provided with a slot for receiving the scale member;
 means connected to the pivot ring for engaging the scale member groove and movably securing the scale member to the pivot ring;
 a handle pivotally receiving the pivot ring for permitting angular adjustment between the handle and the scale member, said handle comprising,
  a pair of opposed handle members having a circular opening therethrough adjacent one end, said circular openings receiving said pivot ring,
  a central support block, and
  means securing the handle members on opposite sides of said block in spaced apart relation for permitting the scale member to be received in a slot formed by said spaced apart handles to thereby permit said handle to be folded approximately parallel to the scale member;
 said central support block being provided with a ball guide passage and the pivot ring having a plurality of ball receiving recesses in the exterior perimeter thereof;
 a ball received in said ball guide passage for being received in selected recesses to fix the angular relationship of the handle relative to the scale member;
 a compression spring urging the ball into contact with the pivot ring; and
 a ball guide member slidably received in said ball guide passage to permit rolling contact of said ball between said ball guide member and the perimeter of the pivot ring, said compression spring urging the slidable ball guide member toward said pivot rings.

2. The invention of claim 1 wherein the central support block has a plunger rod guide passage, and further comprising:
 an elongate plunger rod, one end of said plunger rod being secured to the ball guide member and the other end of the plunger rod being slidably received in said plunger rod guide passage, said compression spring being received on said plunger rod.

3. The invention of claim 2 further comprising:
 a set screw threadably adjustably received in said plunger rod guide passage for selectively fixing the position of said plunger rod to thereby rigidly fix the ball in a ball receiving recess in said pivot ring.

4. A folding square which comprises, in combination:
 a straight edge scale member of the type having a groove along at least one side;
 a generally annular pivot ring, said ring being provided with a slot for receiving the scale member;
 means connected to the pivot ring for engaging the scale member groove and movably securing the scale member to the pivot ring;
 a handle pivotally receiving the pivot ring for permitting angular adjustment between the handle and the scale member, said handle comprising,
  a pair of opposed handle members having a circular opening therethrough adjacent one end, said circular openings receiving said pivot ring,
  a central support block, and
  means securing said handle members on opposite side of said block in spaced apart relation for permitting the scale member to be received in a slot formed by said spaced apart handles, to permit said handle to be folded approximately parallel to said scale member;
 said pivot ring comprising,
  a generally annular portion,
  a unitary integrally formed locking bolt guide formed interiorly of the annular portion, said bolt guide having a bolt passage therethrough,
  oppositely extending annular lip portions extending from the sides of the annular portion, and
  shoulder portions formed at the intersection of the lip portions and the annular portion;
 said circular openings in the respective handle members being received about said annular lip portions in sliding contact therewith and with said shoulder portions;
 wherein said means for engaging the scale member groove comprises a locking bolt received in said locking bolt passage;
 said central support being provided with a ball guide passage and the pivot ring having a plurality of ball receiving recesses in the exterior perimeter thereof;
 a ball received in said ball guide passage for being received in selected recesses to fix the angular relationship of the handle relative to the scale member;
 a compression spring urging the ball into contact with said pivot ring; and a ball guide member slidably received in said ball guide passage to permit rolling contact of said ball between said ball guide member and the perimeter of the pivot ring, said compression spring urging the slidable ball guide member towards the pivot ring.

5. The invention of claim 4 wherein the central support block has a plunger rod guide passage, and further comprising:

an elongate plunger rod, one end of said plunger rod being secured to the ball guide member and the other end of the plunger rod being slidably received in said plunger rod guide passage, said compression spring being received on said plunger rod; and further comprising:

a set screw threadably adjustably received in said plunger rod guide passage for selectively fixing the position of said plunger rod to thereby rigidly fix the ball in a ball receiving recess in said pivot ring.

References Cited

UNITED STATES PATENTS

| | | | |
|---|---|---|---|
| 282,583 | 8/1883 | Starrett | 33—166 X |
| 304,196 | 8/1884 | Hill | 33—106 |
| 1,015,877 | 1/1912 | Du Mouchel | 33—88 |
| 1,139,648 | 5/1915 | Demmer | 33—94 |
| 1,264,161 | 4/1918 | Costas | 33—89 |
| 2,025,473 | 12/1935 | Plumb | 33—102 |
| 2,043,614 | 6/1936 | Hane | 33—170 X |
| 2,113,524 | 4/1938 | Wolfe | 33—102 |
| 2,590,455 | 3/1952 | Pittenger | 33—170 |
| 2,611,186 | 9/1952 | Noble | 33—170 |
| 2,958,950 | 11/1960 | Connors et al. | 33—170 X |

FOREIGN PATENTS 906,421   3/1954   Germany.

HARRY N. HAROIAN, *Primary Examiner.*